US009637325B2

(12) United States Patent
Albin

(10) Patent No.: US 9,637,325 B2
(45) Date of Patent: May 2, 2017

(54) SYSTEMS FOR INJECTING CATALYSTS AND/OR ADDITIVES INTO A FLUIDIZED CATALYTIC CRACKING UNIT AND METHODS OF MAKING AND USING THE SAME

(71) Applicant: W. R. GRACE & CO.-CONN., Columbia, MD (US)

(72) Inventor: Lenny Lee Albin, Sulphur, LA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 14/352,361

(22) PCT Filed: Oct. 18, 2012

(86) PCT No.: PCT/US2012/060787
§ 371 (c)(1),
(2) Date: Apr. 17, 2014

(87) PCT Pub. No.: WO2013/059435
PCT Pub. Date: Apr. 25, 2013

(65) Prior Publication Data
US 2014/0255110 A1 Sep. 11, 2014

Related U.S. Application Data

(60) Provisional application No. 61/548,529, filed on Oct. 18, 2011.

(51) Int. Cl.
B65G 53/66 (2006.01)
B65G 53/26 (2006.01)
(Continued)

(52) U.S. Cl.
CPC ............. B65G 53/26 (2013.01); B01J 8/001 (2013.01); B01J 8/003 (2013.01); B01J 8/004 (2013.01); B01J 8/006 (2013.01); B01J 8/0015 (2013.01); B01J 8/0025 (2013.01); B01J 8/0035 (2013.01); B01J 8/18 (2013.01); B01J 8/24 (2013.01); C10G 11/18 (2013.01); C10G 11/187 (2013.01); B01J 2208/00548 (2013.01);
(Continued)

(58) Field of Classification Search
CPC ............ C10G 11/18; B01J 8/003; B01J 8/006
USPC .......................... 406/171, 172, 50, 145, 151
See application file for complete search history.

(56) References Cited

U.S. PATENT DOCUMENTS 1,385,870 A 7/1921 Gieseler
2,032,367 A 3/1936 Kennedy et al. ............... 302/53
(Continued)

FOREIGN PATENT DOCUMENTS

CA 2776548 4/2011 ............... F23K 3/02
DE 03413757 10/1985
(Continued)

OTHER PUBLICATIONS

International Search Report and Written Opinion dated Dec. 27, 2012 for International Application No. PCT/US12/60787.

Primary Examiner — Joseph Dillon, Jr.
(74) Attorney, Agent, or Firm — Beverly J. Artale; Charles A. Cross

(57) ABSTRACT

Systems for loading catalyst and/or additives into a fluidized catalytic cracking unit are disclosed. Methods of making and using the systems are also disclosed.

13 Claims, 9 Drawing Sheets

(51) Int. Cl.
  *C10G 11/18* (2006.01)
  *B01J 8/18* (2006.01)
  *B01J 8/24* (2006.01)
  *B01J 8/00* (2006.01)

(52) U.S. Cl.
  CPC ............ B01J 2208/00752 (2013.01); B01J 2208/00761 (2013.01); B01J 2208/00769 (2013.01); B01J 2219/002 (2013.01); B01J 2219/00213 (2013.01); B01J 2219/00236 (2013.01); C10G 2300/4012 (2013.01)

(56) References Cited

U.S. PATENT DOCUMENTS

| | | | | |
|---|---|---|---|---|
| 2,992,858 A | 7/1961 | Pendleton | | 302/17 |
| 3,077,365 A * | 2/1963 | Fisher | | A21C 1/143 |
| | | | | 406/109 |
| 3,379,258 A | 4/1968 | Black et al. | | 302/53 |
| 3,542,091 A | 11/1970 | Carter et al. | | 141/65 |
| 3,591,525 A | 7/1971 | Markham et al. | | 252/440 |
| 3,632,173 A | 1/1972 | Reuter | | 302/3 |
| 3,850,582 A | 11/1974 | Luckenbach | | 23/288 |
| 3,989,308 A | 11/1976 | Zimmermann et al. | | 302/3 |
| 4,005,908 A | 2/1977 | Freeman | | 302/3 |
| 4,018,671 A | 4/1977 | Andon et al. | | 208/152 |
| 4,054,784 A | 10/1977 | Ricciardi et al. | | 364/479 |
| 4,082,513 A | 4/1978 | Andon et al. | | 23/288 |
| 4,165,133 A | 8/1979 | Johnson | | 406/109 |
| 4,191,223 A | 3/1980 | Bourgeois | | 141/18 |
| 4,223,044 A * | 9/1980 | Se | | B65D 90/587 |
| | | | | 134/22.1 |
| 4,269,548 A | 5/1981 | von Bennigsen-MacKiewicz et al. | | 177/189 |
| 4,301,880 A | 11/1981 | Krambrock et al. | | 177/189 |
| 4,345,858 A | 8/1982 | Barlow | | 406/34 |
| 4,379,663 A | 4/1983 | Allison | | 406/23 |
| 4,557,637 A | 12/1985 | Barclay et al. | | 406/153 |
| RE32,101 E | 4/1986 | Ricciardi et al. | | 222/56 |
| 4,610,574 A | 9/1986 | Peters | | 406/50 |
| 4,687,381 A | 8/1987 | Dumain et al. | | 406/52 |
| 4,694,740 A | 9/1987 | Daloz | | 99/323 |
| 4,695,205 A | 9/1987 | Levine | | 406/38 |
| 4,701,080 A | 10/1987 | van Aalst | | 406/109 |
| 4,854,353 A | 8/1989 | Russell | | 141/74 |
| 4,880,142 A | 11/1989 | Higuchi et al. | | 222/56 |
| 4,882,784 A | 11/1989 | Tump | | 364/567 |
| 4,883,390 A | 11/1989 | Reintjes et al. | | 406/24 |
| 4,927,523 A | 5/1990 | Donnelly | | 208/120 |
| 4,927,526 A | 5/1990 | Anderson et al. | | 208/152 |
| 4,994,173 A | 2/1991 | Tai-Sheng et al. | | 208/152 |
| 5,081,600 A | 1/1992 | Tump | | 364/571.08 |
| 5,240,683 A | 8/1993 | Maurel et al. | | 422/135 |
| 5,260,880 A | 11/1993 | Tump | | 364/479 |
| 5,335,185 A | 8/1994 | Pitts et al. | | 364/510 |
| 5,357,306 A | 10/1994 | Skye et al. | | 354/324 |
| 5,389,236 A | 2/1995 | Bartholic et al. | | 208/152 |
| 5,890,868 A | 4/1999 | Comardo | | 414/587 |
| 5,947,645 A | 9/1999 | Rixom et al. | | 406/32 |
| 6,132,157 A | 10/2000 | Comardo | | 414/160 |
| 6,358,401 B1 | 3/2002 | Evans | | 208/152 |
| 6,474,372 B2 | 11/2002 | Sanderson et al. | | 141/83 |
| 6,508,930 B1 | 1/2003 | Evans et al. | | 208/113 |
| 6,527,141 B2 | 3/2003 | Sanders | | 222/1 |
| 6,711,525 B1 | 3/2004 | Fox et al. | | 702/184 |
| 6,811,301 B2 | 11/2004 | Packard | | 366/141 |
| 6,859,759 B2 | 2/2005 | Evans | | 702/188 |
| 6,878,656 B2 | 4/2005 | Bartholic | | 502/64 |
| 6,974,559 B2 | 12/2005 | Evans | | 422/110 |
| 6,994,497 B1 * | 2/2006 | Eriksson | | B01J 8/0005 |
| | | | | 406/124 |
| 7,228,990 B2 * | 6/2007 | Schmidt | | B28C 5/40 |
| | | | | 141/83 |
| 7,846,399 B2 | 12/2010 | Albin | | 422/145 |
| 8,012,422 B2 | 9/2011 | Yaluris et al. | | 422/145 |
| 8,113,745 B2 * | 2/2012 | Aoki | | B65G 53/525 |
| | | | | 406/126 |
| 8,899,884 B2 * | 12/2014 | Kretschmer | | C10J 3/723 |
| | | | | 406/10 |
| 8,926,907 B2 * | 1/2015 | Albin | | B01J 8/0015 |
| | | | | 406/122 |
| 8,967,919 B2 * | 3/2015 | Yaluris | | C10G 11/18 |
| | | | | 177/1 |
| 9,315,738 B2 * | 4/2016 | Albin | | C10G 11/18 |
| 2001/0041117 A1 | 11/2001 | Comardo | | 414/160 |
| 2003/0097243 A1 | 5/2003 | Mays et al. | | 703/2 |
| 2003/0111131 A1 | 6/2003 | Zhu et al. | | 141/18 |
| 2004/0099572 A1 | 5/2004 | Evans | | 208/113 |
| 2004/0102929 A1 | 5/2004 | Evans | | 702/188 |
| 2004/0117158 A1 | 6/2004 | Evans | | 702/188 |
| 2004/0166032 A1 | 8/2004 | Evans | | 422/145 |
| 2004/0260487 A1 | 12/2004 | Evans | | 702/50 |
| 2005/0103684 A1 | 5/2005 | Evans | | 208/113 |
| 2005/0106079 A1 | 5/2005 | Evans | | 422/130 |
| 2005/0214177 A1 * | 9/2005 | Albin | | C10G 11/18 |
| | | | | 422/145 |
| 2007/0189935 A1 * | 8/2007 | Yaluris | | C10G 11/18 |
| | | | | 422/145 |
| 2009/0148244 A1 * | 6/2009 | Snowdon | | B65G 53/66 |
| | | | | 406/28 |
| 2010/0034599 A1 * | 2/2010 | Snowdon | | B01J 8/0025 |
| | | | | 406/124 |
| 2011/0056979 A1 * | 3/2011 | Albin | | C10G 11/18 |
| | | | | 222/1 |
| 2011/0203970 A1 | 8/2011 | Albin | | 208/113 |
| 2011/0280769 A1 * | 11/2011 | Yaluris | | B01J 8/0015 |
| | | | | 422/119 |
| 2011/0284588 A1 * | 11/2011 | Yaluris | | C10G 11/18 |
| | | | | 222/205 |
| 2014/0255133 A1 * | 9/2014 | Wilkinson | | B04C 5/185 |
| | | | | 414/291 |
| 2015/0101960 A1 * | 4/2015 | Albin | | B01J 8/0015 |
| | | | | 208/113 |
| 2015/0122372 A1 * | 5/2015 | Stander | | B01J 8/0025 |
| | | | | 141/5 |

FOREIGN PATENT DOCUMENTS

| | | | |
|---|---|---|---|
| EP | 0476249 | 3/1992 | ............ B01F 13/02 |
| EP | 0408606 | 9/1993 | ............ B01J 8/08 |
| JP | S56043129 A | 4/1981 | ............ B65G 53/54 |
| JP | 59127642 A | 7/1984 | |
| JP | 01214519 A | 8/1989 | |
| JP | H02127317 A | 5/1990 | ............ B65G 53/24 |
| WO | 89/07487 | 8/1989 | |
| WO | 94/024229 | 10/1994 | ............ C10G 9/32 |
| WO | 00/48723 | 8/2000 | ............ B01J 8/00 |
| WO | 2005095549 | 10/2005 | ............ C10G 11/00 |

* cited by examiner

SYSTEMS FOR INJECTING CATALYSTS AND/OR ADDITIVES INTO A FLUIDIZED CATALYTIC CRACKING UNIT AND METHODS OF MAKING AND USING THE SAME

CROSS-REFERENCE TO RELATED APPLICATIONS

This application claims priority and the benefit of the filing date of U.S. Provisional Patent Application No. 61/548,529 filed Oct. 18, 2011, and International Application No. PCT/US2012/060787 filed Oct. 18, 2012, the disclosure of which is hereby incorporated herein by reference.

FIELD OF THE INVENTION

The present invention relates to equipment used in fluidized catalytic cracking (FCC) operations and, more particularly, to systems and processes for injecting catalyst and/or additives into equipment units employed to conduct FCC operations, and monitoring pressure within the equipment units.

BACKGROUND OF THE INVENTION

FCC units and systems and processes for injecting catalyst and/or additives into equipment units employed to conduct FCC operations are known. See, for example, International Publication No. WO2005/095549 assigned to W. R. Grace & Co Conn. (hereinafter, "WO2005/095549").

As discussed in WO2005/095549, during the disclosed FCC operations, the dust collector and transfer pot of a loader are pressurized in order to move one or more catalysts and/or additives through the loader. A number of system and process problems can occur during one or more steps utilized to move catalysts and/or additives through the loader and into FCC equipment units.

Efforts continue to identify ways to monitor system and process parameters so as to detect potential problems during operation of a loader used in FCC operations.

SUMMARY OF THE INVENTION

The present invention is directed to systems for injecting catalyst and/or additives into a fluidized catalytic cracking unit, and monitoring pressure within the system via at least one differential pressure gauge component positioned within a dust collector of the system. The disclosed systems and processes enable monitoring of system pressure within the dust collector and/or transfer pot of the system so as to identify potential problems within the system during one or more steps utilized to move catalysts and/or additives through the loader and into FCC equipment units.

In one exemplary embodiment, the system for injecting one or more catalysts and/or additives into a fluidized catalytic cracking unit comprises a dust collector in fluid communication with at least one storage bin holding the one or more catalysts and/or additives; a vacuum producer in fluid communication with the dust collector so that the vacuum producer generates a vacuum within the dust collector that draws the one or more catalysts and/or additives into the dust collector; a filter positioned within the dust collector and being operatively adapted to filter fluid exiting the dust collector in response to a vacuum produced by the vacuum producer; a transfer pot in fluid communication with the dust collector for receiving the one or more catalysts and/or additives from the dust collector, the transfer pot being in fluid communication with the fluidized catalytic cracking unit and a source of pressurized air so that the one or more catalysts and/or additives is transferred to the fluidized catalytic cracking unit; and at least one differential pressure gauge having a differential pressure gauge component positioned within the dust collector.

The present invention is further directed to method of monitoring a pressure within a system for injecting catalyst and/or additives into a fluidized catalytic cracking unit. In one exemplary embodiment, the method of monitoring a pressure within a system for injecting catalyst and/or additives into a fluidized catalytic cracking unit comprises monitoring a first pressure differential across a filter positioned within a dust collector and operatively adapted to filter fluid (i.e., air) exiting the dust collector in response to a vacuum produced by a vacuum producer when the system is in a vacuum mode; monitoring the first pressure differential across the filter when the system is in a transfer pot pressurized mode; monitoring the first pressure differential across the filter when the system is in a stand-by mode; and providing one or more signals selected from: (i) a first signal if the first pressure differential equals or exceeds a first pressure differential threshold amount during the vacuum mode, (ii) a second signal if the first pressure differential changes a first pressure change amount during the transfer pot pressurized mode, and (iii) a third signal if the first pressure differential changes a first pressure change amount during the stand-by mode.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION OF THE INVENTION

The present invention is directed to systems for (i) injecting catalyst and/or additives into a fluidized catalytic cracking unit, and (ii) monitoring pressure within the system via at least one differential pressure gauge positioned within a dust collector of the system. An exemplary system for (i) injecting catalyst and/or additives into a fluidized catalytic cracking unit, and (ii) monitoring pressure within the system via at least one differential pressure gauge positioned within a dust collector of the system is shown in FIG. 1.

Figure 1:
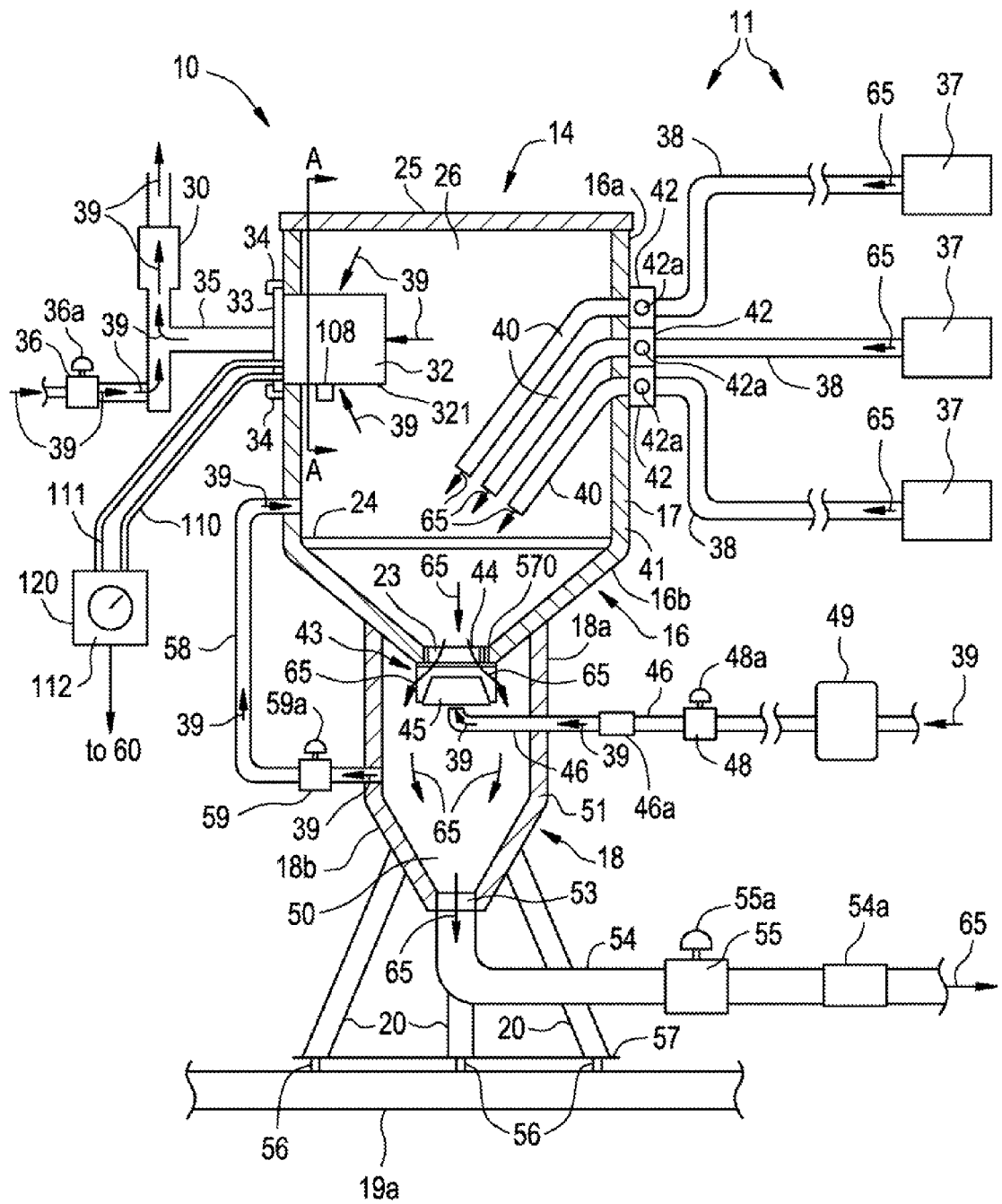
FIG. 1 depicts a schematic side view of an exemplary system for injecting catalyst and/or additives into an FCC unit, showing (i) a longitudinal cross sectional view of a dust collector and a transfer pot of the exemplary system in combination with (ii) a differential pressure gauge system for use therewith.

As shown in FIG. 1, exemplary loading system 10 forms part of an exemplary overall system 11 for storing and loading catalyst and/or additives. Overall system 11 includes loading system 10, and one or more storage bins 37. Loading system 10 comprises a loading unit 14 comprising a dust collector 16 and an adjoining transfer pot 18. Loading system 10, as discussed in detail below, produces a vacuum that draws catalyst and/or additive from one or more storage bins 37 and into dust collector 16, which subsequently falls to the bottom of dust collector 16 and into transfer pot 18. Transfer pot 18 is subsequently pressurized, and the catalyst and/or additive is injected into a regenerator of the FCC unit (not shown) in response to one or more system parameters, e.g., the pressure within transfer pot 18.

Figure 3:
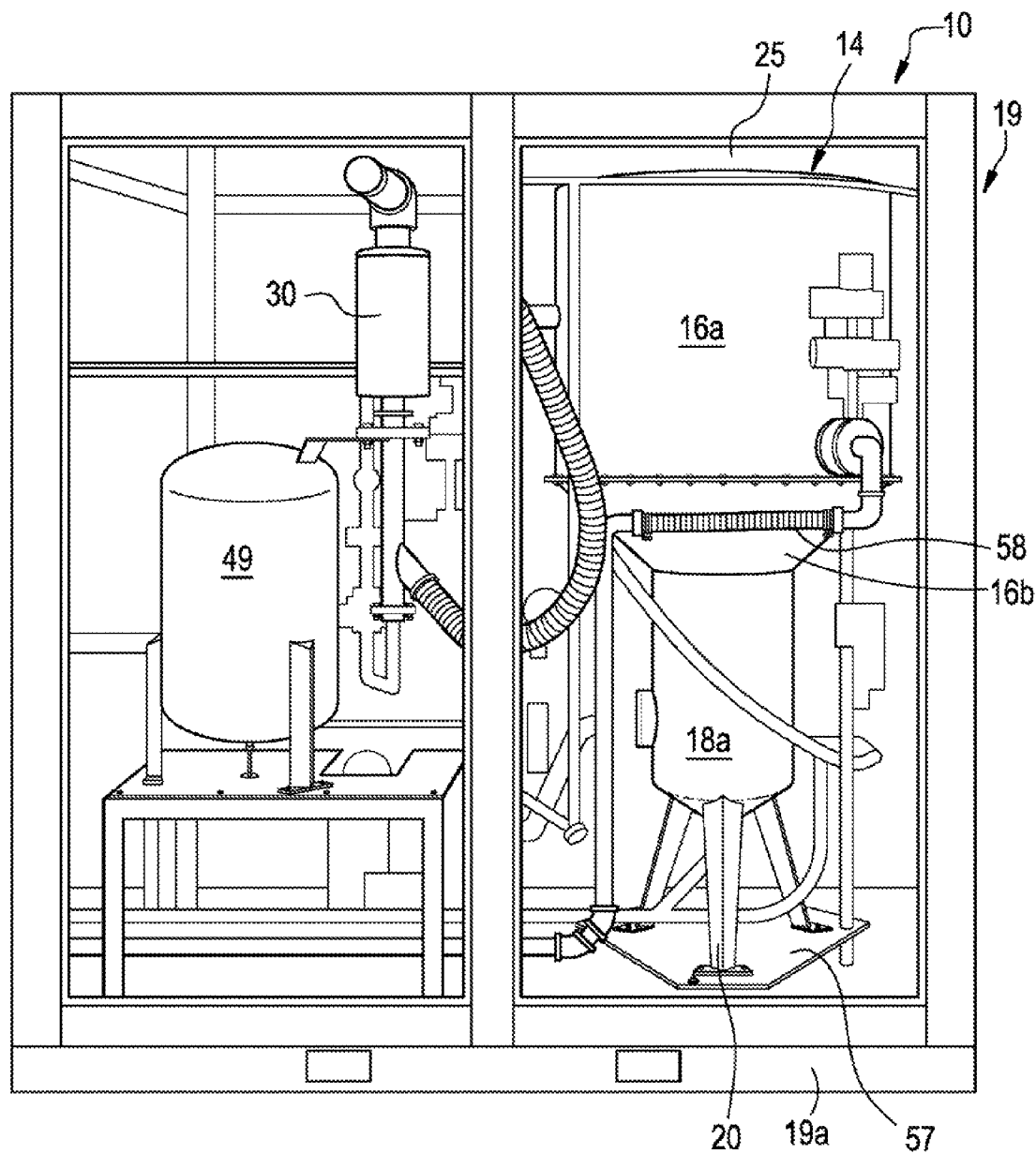
FIG. 3 is a side view of the exemplary system shown in FIG. 1 positioned within an exemplary cabinet.
Figure 4:
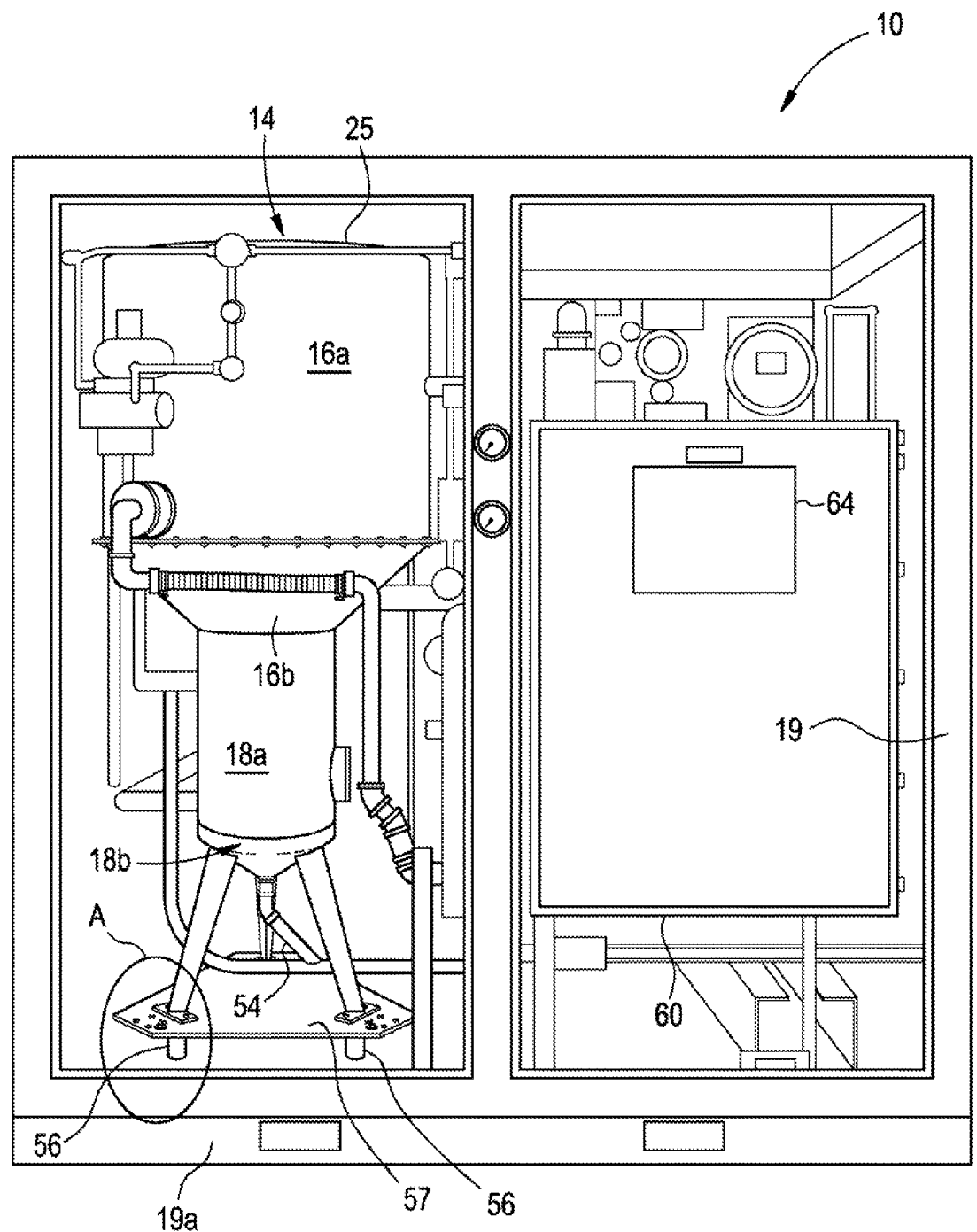
FIG. 4 is a side view of the exemplary system shown in FIGS. 1 and 3 from a perspective rotated approximately 180° from the perspective shown in FIG. 3.

Loading unit 14 can be housed within a cabinet 19 as shown in FIGS. 3-4. (Cabinet 19 is shown in the figures with its side panels removed, for clarity.) Loading unit 14 is typically supported by a plurality of legs 20 affixed to transfer pot 18. Cabinet 19 is optional and can be configured to accommodate the particular configuration and size of the injection system. Typically, side panels to the cabinet are removable (and/or designed as doors which are easily opened) and substantially full length and width of the enclosure to give an operator or repair person full access to the system. Alternatively, closable portals can be placed in walls that are more substantially affixed to the system's base, with the portals used for access to relatively small components of the system.

Cabinet 19 serves to protect loading system 10 from damaging elements in the environment, e.g., plant dust, rain, direct sunlight, as well as reduces dusting created by the movement of catalyst as it is drawn in and then injected by loading system 10. Cabinet 19 also can retain any catalyst particulate that may spill or leak from broken or damaged hoses that transport catalyst into and throughout loading system 10, as well as retain any fugitive emissions from the contained equipment.

Cabinet 19 can also be designed to be large enough to provide shelter for an operator or repair person. Cabinet 19 also "unitizes" overall system 11, thereby making it easier to transport and install overall system 11. Indeed, cabinet 19 could be designed to serve as a shipping container in addition to serving as a protective enclosure.

As shown in FIG. 1, dust collector 16 comprises a sidewall 17. Sidewall 17 is of a suitable strength and thickness to withstand the presence of a vacuum within dust collector 16. The cross section and overall shape of dust collector 16 can vary. Dust collector 16 depicted in the figures has a substantially cylindrical upper portion 16a, and a substantially conical lower portion 16b that adjoins upper portion 16a. An opening 23 is formed in the center of lower portion 16b (see FIG. 1). A screen 24 is positioned across lower portion 16b. In other embodiments, the cross section of upper portion 16a and lower portion 16b can be square or rectangular, and the overall shape can be in the form of a square or rectangular column. (Directional terms such as "upper," "lower," etc. are used herein with reference to the component orientations depicted in FIG. 1. These terms are used for exemplary purposes only, and are not intended to limit the scope of the appended claims.)

Dust collector 16 also includes a cover 25, which mates with an upper edge of sidewall 17. A gasket is positioned between cover 25 and sidewall 17 to form a substantially airtight seal there between. Sidewall 17 and cover 25 define an internal volume 26 within dust collector 16 as shown in FIG. 1. Dust collector 16 also comprises a suitable filter 32 as shown in FIG. 1. Filter 32 can be, for example, a MACTIFLO™ model E376094 filter.

Filter 32 is typically mounted within upper portion 16a of dust collector 16. The sidewall typically includes a hatch 33 to provide access to the interior of upper portion 16a (and filter 32) as shown in FIG. 1. Hatch 33 is typically secured to sidewall 17 of dust collector 16 using brackets 34 that permit hatch 33 to be removed with a minimal expenditure of time and effort, thereby facilitating replacement of filter 32 with a minimum of time and effort. Alternative embodiments of loading system 10 can be equipped with more than one of filters 32.

Loading system 10 further comprises at least one differential pressure gauge 120 comprising an internal pressure nipple 108 positioned within dust collector 16. In exemplary loading system 10, internal pressure nipple 108 is in a position proximate to or on an outer surface 321 of filter 32. Differential pressure gauge 120 of loading system 10 further comprises tubing 110 connecting internal pressure nipple 108 to gauge 112, an external pressure nipple 109 positioned within filter 32 (see, FIG. 2) (i.e., for measuring the pressure drop across filter 32) and tubing 111 connecting external pressure nipple 109 to gauge 112. As shown in FIG. 1, differential pressure gauge 120 may be electrically connected to a controller 60 (shown in FIG. 3) as discussed further below.

Figure 2:
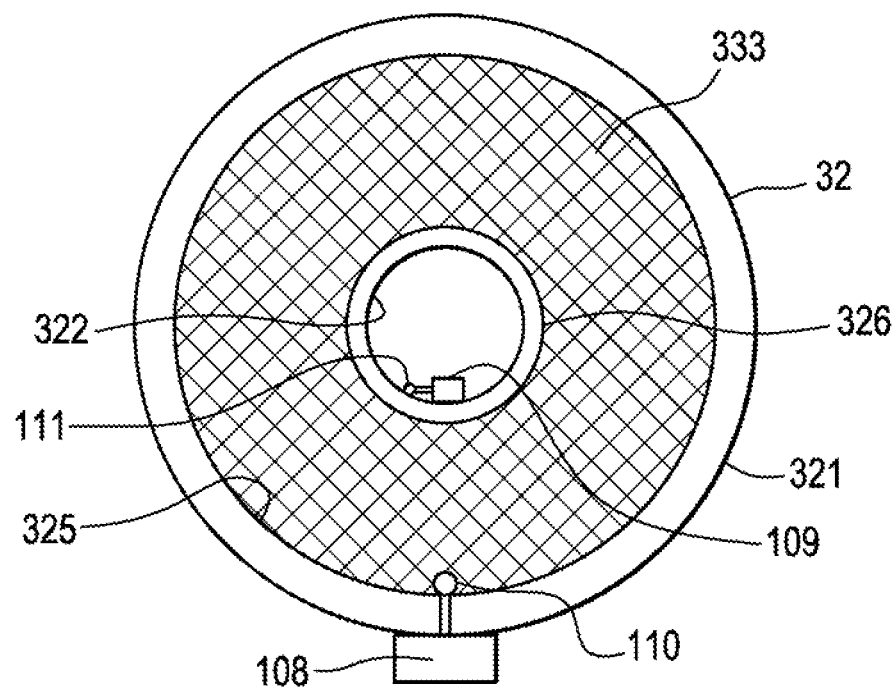
FIG. 2 depicts a cross sectional view of a filter and exemplary differential pressure components use therewith as viewed along A-A shown in FIG. 1.

FIG. 2 provides a cross sectional view of filter 32 as viewed along A-A shown in FIG. 1. As shown in FIG. 2, internal pressure nipple 108 may be positioned proximate or on outer surface 321 of filter 32, while external pressure nipple 109 may be positioned at a location within filter 32, such as along an innermost surface 322 of filter 32. Filter 32 further comprises filtration material 333 positioned between outer wall inner surface 325 and inner wall outer surface 326. As shown in FIG. 2, internal pressure nipple 108 and external pressure nipple 109 are positioned so as to measure a pressure drop across filter 32.

It should be understood that the locations of internal pressure nipple 108 and external pressure nipple 109 within loading system 10 are one example of suitable locations of internal pressure nipple 108 and external pressure nipple 109 within a given loading system. It should be further understood that internal pressure nipple 108 may be positioned at any location within a given loading system as long as internal pressure nipple 108 is capable of measuring a pressure within dust collector 16 (e.g., at any location that enables internal pressure nipple 108 to measure a pressure on the "dirty" side of filter 32). Further, external pressure nipple 109 may be positioned at any location within a given loading system as long as external pressure nipple 109 is capable of measuring a pressure of fluid (e.g., air) exiting dust collector 16 (e.g., at any location that enables external pressure nipple 109 to measure a pressure on the "clean" side of filter 32).

Loading system 10 also comprises suitable vacuum producer 30 as shown in FIG. 1. For example, vacuum producer 30 can be an Empire two-inch VACUTRAN™ S150 vacuum producer. Vacuum producer 30 is typically mounted within cabinet 19 (see FIG. 3). Vacuum producer 30 is typically mounted separately from loading unit 14. Vacuum producer 30 is in fluid communication with filter 32 by way of a hose 35. Vacuum producer 30 is also in fluid communication with a suitable source of pressurized air (not shown). (The source of pressurized air can be the plant air typically available at refineries.) The flow of pressurized air into vacuum producer 30 can be regulated by a suitable valve 36 having an actuator 36a as shown in FIG. 1.

Vacuum producer 30 can operate in a manner commonly known to those skilled in the art of vacuum-chamber design. In particular, opening valve 36 permits the pressurized air to flow through vacuum producer 30. The flow of pressurized air through vacuum producer 30 draws air from internal volume 26 of dust collector 16, thereby generating a vacuum within internal volume 26. (Vacuum producer 30 draws the air through filter 32, thereby causing dust collector 16 to collect the dust generated by the flow of catalyst and/or additive into dust collector 16.) The respective directions of various airflows within loading system 10 are denoted by arrows 39 in FIG. 1.

Loading system 10 draws catalyst and/or additive from storage bins in response to the vacuum within internal volume 26. In particular, dust collector 16 is in fluid communication with storage bins 37 (see FIG. 1). Storage bins 37 hold catalyst and/or additives to be injected into the FCC unit. Storage bins 37 can be, for example, shipping containers used to transport catalyst and/or additives to the refinery at which loading system 10 is installed.

Each storage bin 37 is coupled to dust collector 16 by a corresponding hose (or pipe) 38. A suitable valve 42 having an actuator 42a is located between each hose 38 and dust collector 16. Each valve 42 isolates its associated storage bin 37 from dust collector 16 on a selective basis. Valves 42 are typically installed on upper portion 16a of dust collector 16, and are in fluid communication with internal volume 26 by way of corresponding openings formed in upper portion 16a of dust collector 16. (Hoses 38 and valves 42 thus form part of overall system 11 for storing and loading catalyst and/or additives). Hoses 38 are typically equipped with fittings that permit hoses 38 to be readily removed from dust collector 16 and storage bins 37.

Opening one of valves 42 permits catalyst and/or additive to be drawn from the associated storage bin 37 by way of the associated hose 38, in response to the vacuum within internal volume 26. The catalyst and/or additive is thus drawn directly from one of storage bins 37 and into loading system 10 without the need to load the catalyst and/or additive into a storage hopper.

Loading system 10 is depicted as being equipped with three sets of valves 42 and hoses 38, for exemplary purposes only. Alternative embodiments can be equipped with more or less than three valves 42 and three hoses 38, and can draw catalyst and/or additive from more or less than three of storage bins 37.

One or more (2, 3, 4, etc.) storage bins 37 can be positioned at a location remote from loading system 10. For example, in some embodiments, storage bins 37 can be located up to twenty feet from loading system 10. (The maximum distance between loading system 10 and storage bins 37 is application dependent, and can vary with factors such as the capacity of vacuum producer 30, the diameter of hoses 38, etc. A particular value for this parameter is specified for exemplary purposes only.)

As shown in FIG. 1, dust collector 16 includes three pipe guides 40. Each pipe guide 40 is in fluid communication with an associated one of hoses 38. The catalyst and/or additive is drawn into internal volume 26 by way of one of pipe guides 40. Pipe guides 40 desirably discharge the catalyst or additive proximate into internal volume 26, proximate screen 24.

It should be noted that the depiction of overall system 11 in FIG. 1 is schematic in nature, and the relative positions of the various hoses, piping, etc. of overall system 11 can be different than those depicted in FIG. 1. For example, the openings formed in upper portion 16a of dust collector 16 to accommodate hoses 38 can be positioned around the circumference of upper portion 16a, in lieu of the vertical arrangement depicted in FIG. 1. In other embodiments, multiple hoses can be positioned on two or more sides of upper portion 16a.

During operation, the catalyst or additive drops toward the bottom of dust collector 16, i.e., toward lower portion 16b, after being discharged from pipe guides 40 due to gravity. The catalyst and/or additive passes through screen 24 as it drops (see FIG. 1). The mesh of screen 24 is preferably chosen to block the passage of relatively large clumps or catalyst and/or additive (or foreign objects), while permitting relatively fine granules of catalyst and/or additive to flow freely there through. The substantially conical shape of lower portion 16b directs the catalyst and/or additive toward opening 23 in lower portion 16b.

Loading system 10 includes the valve 43 for covering and sealing opening 23 on a selective basis. Valve 43 can be, for example, a plug valve comprising a seat 44 and plug 45. Seat 44 is secured to lower portion 16b, around the periphery of opening 23. Plug 45 is movable between an upper and a lower position (i.e., plug 45 is depicted in its lower position in FIG. 1).

Valve 43 is actuated by pressurized air. The pressurized air is directed to valve 43 by way of piping 46 that extends through transfer pot 18. The flow of pressurized air into piping 46 can be initiated and interrupted on a selective basis by a valve 48 in fluid communication with piping 46. Valve 48 includes an actuator 48a.

The pressurized air impinges upon plug 45 after exiting of piping 46. More particularly, the pressurized air is directed to an interior portion of plug 45, and urges plug 45 into its closed position against seat 44. The contact between plug 45 and seat 44 substantially seals opening 23.

Plug 45 drops from its closed to its open position when the pressurized air is interrupted by closing valve 48. The resulting gap between plug 45 and seat 44 permits catalyst and/or additive reaching the bottom of lower portion 16b to pass through opening 23 and into transfer pot 18 (see FIG. 1).

Loading system 10 preferably includes a volume chamber and moisture trap 49 in fluid communication with piping 46 (see FIGS. 1 and 3). The volume chamber and moisture trap 49 removes moisture from the pressurized air directed to valve 43.

Transfer pot 18 comprises a sidewall 51, which should be of a suitable strength and thickness to withstand pressurization of transfer pot 18. The cross section and overall shape of transfer pot 18 can vary. Transfer pot 18 depicted in the figures has a substantially cylindrical upper portion 18a, and a substantially conical lower portion 18b that adjoins upper portion 18a. Upper portion 18a and lower portion 18b of transfer pot 18, and lower portion 16b of dust collector 16 define an internal volume 50 within transfer pot 18 (see FIG. 1). (Lower portion 16b and valve 43 thus form a boundary between internal volume 26 of dust collector 16 and internal volume 50 of transfer pot 18.)

An opening 53 is formed in the center of lower portion 18a of transfer pot 18. Transfer pot 18 is coupled to the regenerator of the FCC unit by piping 54. Piping 54 is in fluid communication with opening 53. Catalyst and/or additive enters piping 54 by way of opening 53 and subsequently flows to the regenerator, as discussed below.

A valve 55 having an actuator 55a is installed in piping 54. Valve 55 permits transfer pot 18 to be isolated from the regenerator on a selective basis. A suitable transfer pot 18 can be obtained, for example, by adapting a Clemtex, Inc. model 2452 six-cubic foot sandblasting pot, or a model 1648 two-cubic-foot sandblasting pot to mate with dust collector 16. (The sandblasting pot can be mated with dust collector 16 by securing lower portion 16b of dust collector 16 to the upper periphery of the sandblasting pot by a suitable means such as welding.)

It should be understood that valve 55 and actuator 55a may be installed in any portion of piping 54 between transfer pot 18 and the regenerator. For example, in alternative embodiments (not shown in the figures), valve 55 and actuator 55a may be positioned at the exit of transfer pot 18 (i.e., at opening 53 shown in FIG. 1) instead of closer to the regenerator (not shown).

Figure 5:
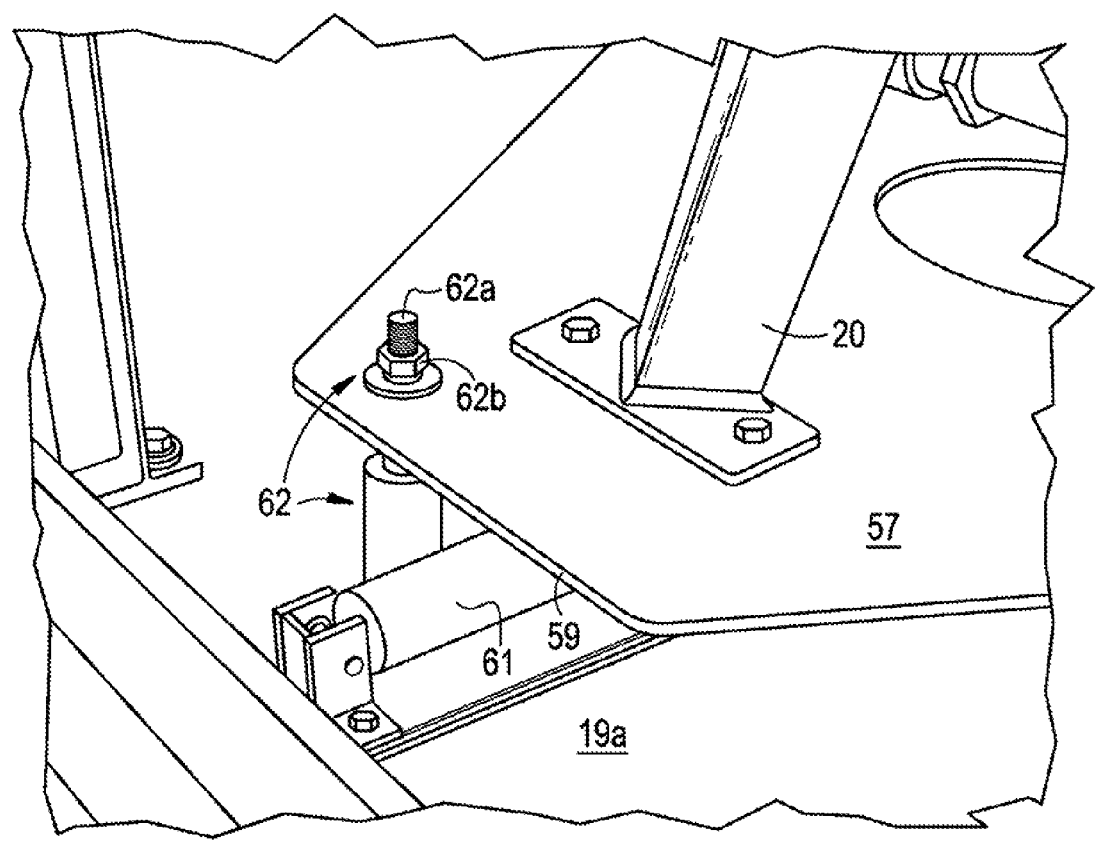
FIG. 5 is a magnified view of the area designated "A" in FIG. 4.
Figure 6:
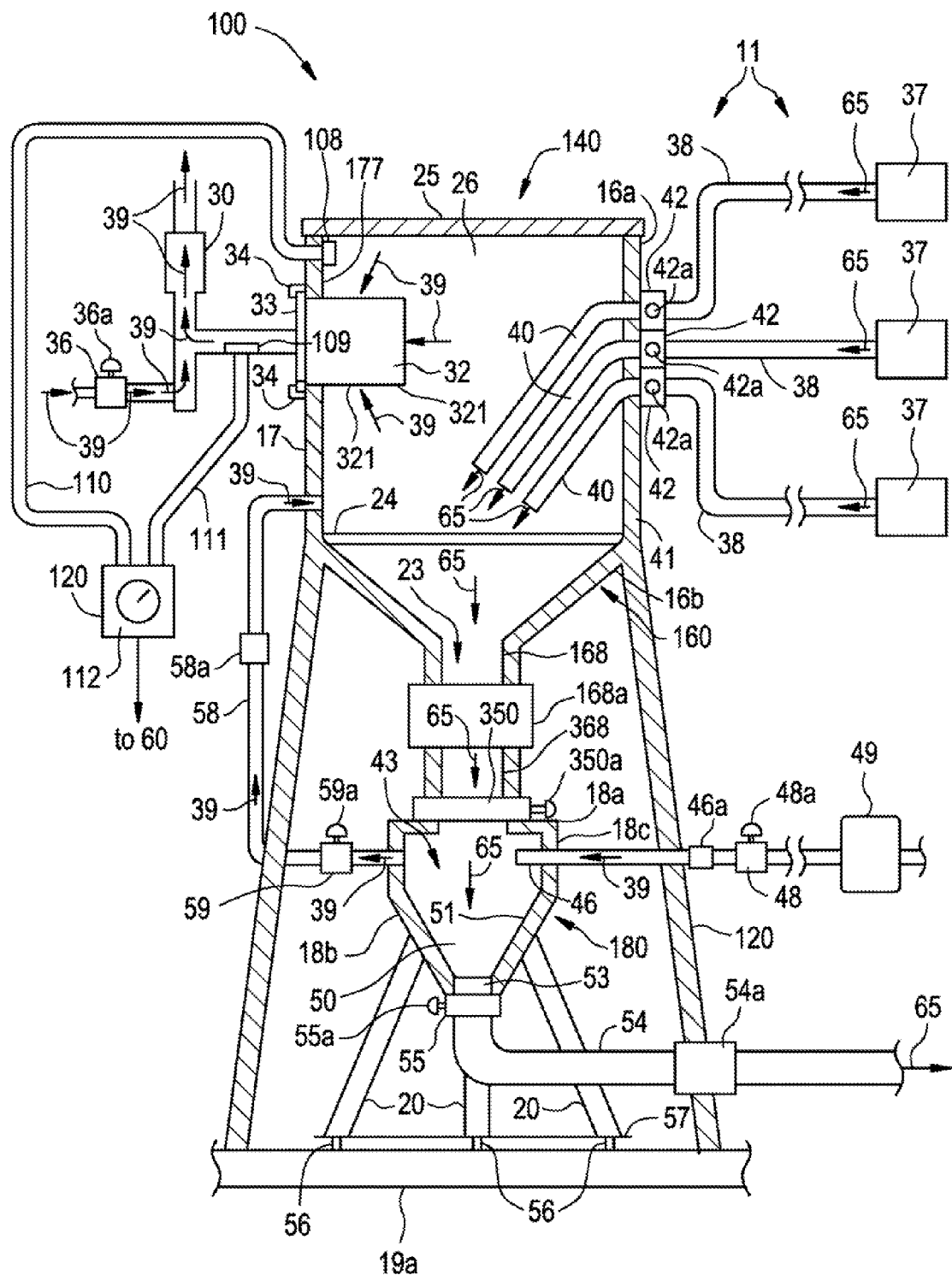
FIG. 6 depicts a schematic side view of another exemplary system for injecting catalyst and/or additives into an FCC unit, showing (i) a longitudinal cross sectional view of a dust collector and a transfer pot of the exemplary system in combination with (ii) a differential pressure gauge system comprising an exemplary differential pressure component positioned within the dust collector and another exemplary differential pressure component positioned within a hose exiting the dust collector.

Loading unit 14 is supported by a plurality of load cells 56 (see FIGS. 1 and 5-6). Load cells 56, as discussed below, provide a measure of the weight of loading unit 14 in both an unloaded and loaded condition, i.e., with and without catalyst and/or additive therein. Load cells 56 are preferably mounted between a base 19a of cabinet 19, and a plate 57 fixedly coupled to legs 20 of transfer pot 18.

Each load cell 56 can be restrained from substantial horizontal movement by a corresponding restraint 61 (i.e., restraints 61 are shown only in FIG. 5 for clarity). Each restraint 61 is pivotally coupled to base 19a of cabinet 19.

Loading system 10 can include a plurality of jack assemblies 62 (i.e., jack assemblies 62 are shown only in FIG. 5 for clarity). Each jack assembly 62 comprises a threaded shaft 62a fixedly coupled to base 19a of cabinet 19. Two nuts 62b are threadably coupled to each shaft 62a. Nuts 62b are located above and below plate 57. Lower nuts 62b can be raised so that lower nuts 62b support plate 57 (and the portion of loading system 10 positioned on plate 57). Upper nuts 62b can be lowered to lock plate 57 in position, i.e., plate 57 can be sandwiched between upper and lower nuts 62b.

Jack assemblies 62 can thus substantially isolate load cells 56 from the weight of loading system 10. This feature can be used, for example, to protect load cells 57 from being damaged by impact loads during shipping of loading system 10.

External connections to loading unit 14 are preferably configured so as to introduce a negligible tare into the load cell readings. For example, piping 54 includes a flexible section 54a that substantially decouples transfer pot 18 from the portion of piping 54 connected to the regenerator, thereby minimizing any tare introduced into the load cell readings (see FIG. 1). Piping 46 likewise includes a flexible section 46a that substantially decouples transfer pot 18 from the portion of piping 46 connected to the plant-air equipment. Moreover, hoses 35 and 38 preferably have sufficient flexibility so that any tare introduced thereby is negligible.

Internal volume 26 of dust collector 16 and internal volume 50 of transfer pot 18 are in fluid communication on a selective basis by way of piping 58. A valve 59 having an actuator 59a is located in piping 58 to selectively open and close the path formed by piping 58. Piping 58 is used to equalize the pressures within internal volumes 26 and 50 as discussed below.

Loading system 10 comprises a controller 60 (see FIG. 4). Actuators 36a, 42a, 48a, 55a and 59a of respective valves 36, 42, 48, 55 and 59 may be electrically coupled to controller 60. This feature permits the operation of valves 36, 42, 48, 55 and 59 to be controlled by controller 60. As discussed above, each of the one or more differential pressure gauges 120 may also be electrically coupled to controller 60.

Controller 60 is a programmable loop controller (PLC), although virtually any type of computing device such as a minicomputer, microcomputer, etc. can be used as controller 60 in alternative embodiments. A server or mainframe computer that controls other equipment and processes at the refinery in which loading system 10 is operated can also be used to control loading system 10 in the alternative. For example, a computer based system known as a "distributed control system" or DCS is an example of a centralized system used by FCC unit operators to control a number of unit operations. Controller 60 can be coupled to and/or communication lines can be established between controller 60 and the DCS so that the DCS controls the loading system through the controller.

Controller 60 can include a control panel 64 for inputting commands and operating data to controller 60 (see FIG. 4). Controller 60 and control panel 64 can be mounted on cabinet 19. Alternatively, control panel 64 by itself, or both control panel 64 and controller 60 can be mounted at a convenient location remote from the remainder of loading system 10. For example, control panel 64 can be mounted in a central control room of the refinery, thus allowing controlled operation of loading system 10 on a remote basis.

Controller 60 may be configured/programmed to perform one or more of the following operations within overall system 11:

(a) cause a predetermined amount of catalyst and/or additive to be injected into a regenerator (not shown):

(b) facilitate injection of catalyst and/or additive on a cyclical basis (e.g., one or more injections per 24 hour period, and/or an injection every 4 hours);

(c) facilitate injection of catalyst and/or additive on a non-cyclical basis (e.g., single injections, which may differ from one another, at specific times over a period of time, such as 48 hours):

(d) automatically calculate the amount of catalyst and/or additive to be injected during each injection and the particular storage bin 37 from which the catalyst and/or additive is to be drawn based on user inputs;

(e) activate one or more actuators, such as actuator 42a of valve 42, associated with a particular storage bin 37 from which the catalyst and/or additive is to be drawn;

(f) activate one or more actuators, such as actuator 36a of valve 36, to allow pressurized air to flow through vacuum producer 30;

(g) monitor the weight of loading unit 14, and the weight of the catalyst and/or additive added thereto via load cells 56, which are electrically coupled to controller 60;

(h) calculate the amount of catalyst and/or additive that is added to loading system 10 (i.e., controller 60 performs this calculation by subtracting the live weight of loading system 10 at a given instant from the live weight of loading system 10 at the start of the cycle, i.e., immediately prior to the opening of valves 36 and 42 (loading unit 14 is assumed to be substantially empty of catalyst and/or additive at the start of the cycle));

(i) stop the flow of catalyst and/or additive to dust collector 16 as the amount of catalyst and/or additive added to loading system 10 approaches the amount to be injected into the regenerator during each cycle (this amount is subsequently referred to as a "target value");

(j) send a control input to actuator 48a of valve 48 to cause valve 48 to open, permitting pressurized air to enter internal volume 50 of transfer pot 18 by way of piping 46;

(k) send a control input to actuator 48a of valve 48 when the difference between the pneumatic pressures in internal volume 50 and the regenerator reaches a predetermined value, i.e., when the pressure in internal volume 50 exceeds the pressure in the regenerator by a predetermined amount, causing valve 48 to close;

(l) send a control input to actuator 55a of valve 55 to cause valve 55 to open, causing catalyst and/or additive in transfer pot 18 to flow into the regenerator by way of piping 54;

(m) send a control input to actuator 55a to close valve 55, after a predetermined interval has passed following issuance of control input to open valve 55 (alternatively, controller 60 can send a control input to actuator 55a to close valve 55 when the pressure differential between internal volume 50 and the regenerator reaches approximately zero);

(n) send a control input to actuator 59a of valve 59 to (i) cause valve 59 to close during a transfer pressurization step (i.e., catalyst and/or additive is transferred from transfer pot 18 to the FCC) or (ii) open following the transfer pressurization step so as to permit the pneumatic pressures within internal volumes 26 and 50 to substantially equalize;

(o) monitor a pressure difference reading of at least one differential pressure gauge 120 during a standard loading procedure (i.e., across filter 32); —monitor a pressure difference reading of at least one differential pressure gauge 120 having a differential pressure gauge component (i.e., internal pressure nipple 108) positioned within dust collector 16 (i.e., on the "dirty" side of filter 32) and another differential pressure gauge component (i.e., external pressure nipple 109, for example, positioned within filter 32 as shown in FIG. 1 or within hose 35 as shown in FIG. 6, discussed below) (i.e., on the "clean" side of filter 32) during any stage of a standard loading procedure;

(p) monitor a pressure difference reading across filter 32 of a single differential pressure gauge 120 during various stages of a standard loading procedure;

(q) monitor a first pressure differential across filter 32 positioned within dust collector 16 when system 10 is in a vacuum mode, and provide a first signal if the first pressure differential equals or exceeds a first pressure differential threshold amount (e.g., a threshold amount of greater than about 4.0 inches of water, or about 5.0 or about 6.0 or about 7.0 or about 8.0 or about 9.0 or about 10.0 inches of water, preferably, greater than about 8.0 inches of water) during the vacuum mode;

(r) monitor a first pressure differential across filter 32 when system 10 is in a transfer pot pressurized mode, and provide a second signal if the first pressure differential changes a first pressure change amount (e.g., a change of about 0.3 to about 0.5 inches of water) during the transfer pot pressurized mode; and (s) monitor a first pressure differential across filter 32 when system 10 is in a stand-by mode, and provide a third signal if the first pressure differential changes a first pressure change amount (e.g., a change of about 0.3 to about 0.5 inches of water) during the stand-by mode.

It should be noted that the herein-described differential pressure gauge 120 and its components (e.g., internal pressure nipple 108 and external pressure nipple 109) shown in FIGS. 1-2 may also be used with loading systems such as loading system 100 shown in FIG. 6. As discussed in U.S. application Ser. No. 13/049,440, filed on Mar. 16, 2011 and assigned to the present assignee, the subject matter of which is hereby incorporated by reference in its entirety, loading system 100 enables either (i) a minimal weight contribution provided by the dust collector or (ii) no weight contribution at all provided by the dust collector as measure by load cells 56.

As shown in FIG. 6, overall system 110 comprises many of the components of overall system 11, as well as some additional system features. Overall system 110 comprises loading system 100, wherein dust collector 160 and transfer pot 180 are separated from one another by piping 168 exiting dust collector 160, piping 368 entering transfer pot 180, and flexible section 168a positioned there between. Flexible section 168a substantially decouples dust collector 160 from transfer pot 180, thereby minimizing (i.e., desirably, completely eliminating) any tare weight contributed by dust collector 160, the contents of dust collector 160 (e.g., filter 32, pipe guides 40, particles that do not pass thru screen 24, etc.), and the components attached to dust collector 160 (e.g., differential pressure gauge 120, hoses 35 and 38, valves 42, valve 55, etc.) into the weight measurements of the plurality of load cells 56.

As shown in FIG. 6, piping 58 may also comprise a flexible section 58a, which further decouples dust collector 160 from transfer pot 180, thereby further minimizing (i.e., desirably, completely eliminating) any tare weight contributed by dust collector 160, the contents of dust collector 160, and the components attached to dust collector 160 into weight measurements of the plurality of load cells 56.

Loading system 100 further comprises legs 120, which support the weight of dust collector 160 above transfer pot 180. In alternative embodiments (not shown), the weight of dust collector 160 may be supported by wall structure of cabinet 19 (see, cabinet 19 in FIGS. 3-4).

Loading system 100 operates in a manner as described above in reference to loading system 10, except that load cells 56 only weigh transfer pot 180, its contents (i.e., the catalyst and/or additive), and any components directly attached to transfer pot 180 (i.e., a portion of piping 46, plug 45, a portion of piping 168, a portion of piping 58, valve 55, a portion of piping 54, valve 59, piping 368, and legs 20 as shown in FIG. 6). In this embodiment, the plurality of load cells 56 do not weigh dust collector 160, the contents of dust collector 160 (e.g., filter 32, pipe guides 40, particles that do not pass thru screen 24), and the components attached to dust collector 160. The weight measurement of transfer pot 180 and its contents (i.e., the catalyst and/or additive), as measured by the plurality of load cells 56, contains either (i) a minimal weight contribution provided by dust collector 160 (as well as the contents of dust collector 160 (e.g., filter 32, pipe guides 40, particles that do not pass thru screen 24), and the components attached to dust collector 160) or (ii) no weight contribution at all provided by dust collector 160 (as well as the contents of dust collector 160 (e.g., filter 32, pipe guides 40, particles that do not pass thru screen 24), and the components attached to dust collector 160).

As shown in FIG. 6, in exemplary loading system 100, exemplary differential pressure gauge 120 comprising internal pressure nipple 108 positioned within dust collector 16 along inner surface 177 of sidewall 17 proximate cover 25 (i.e., within dust collector 16 and on a "dirty" side of filter 32). Exemplary differential pressure gauge 120 also comprises external pressure nipple 109 positioned within hose 35 exiting filter 32 and dust collector 16 (i.e., on a "clean" side of filter 32). As shown in FIG. 6, exemplary differential pressure gauge 120 further comprises tubing 110 connecting internal pressure nipple 108 to gauge 112, and tubing 111 connecting external pressure nipple 109 to gauge 112. Like loading system 10 shown in FIG. 1, differential pressure gauge 120 of exemplary loading system 100 may be electrically connected to a controller 60 (shown in FIG. 3).

As further shown in FIG. 6, discharge valve 55 and actuator 55*a* are positioned at the exit of transfer pot 18 at opening 53. Further, instead of pop-up valve 45 and O-ring 570 (as shown in FIG. 1), a mechanically actuated valve 350 and actuator 350*a* are positioned above transfer pot 18 (e.g., bolted onto a top of transfer pot 18) within piping 368. Mechanically actuated valve 350 may comprise, for example, a mechanically operated valve comprising a piston that closes the valve during a material transfer step (i.e., the transfer pot pressurization step/mode), and opens and remains open after the pressurization step until the next material transfer step. Mechanically actuated valve 350 may comprise, for example, an EVERLASTING™ 2.0 inch valve (Everlasting Valve Company, Inc. (South Plainfield, N.J.)).

The systems of the present invention enable efficient injection of one or more catalysts and/or additives into a fluidized catalytic cracking unit. As shown in FIGS. 1-6 and as further discussed below, exemplary systems of the present invention may comprise one or more of the following components and/or component features:

(a) a dust collector in fluid communication with at least one storage bin holding one or more catalysts and/or additives;

(b) a vacuum producer in fluid communication with the dust collector so that the vacuum producer generates a vacuum within the dust collector that draws the one or more catalysts and/or additives into the dust collector;

(c) a transfer pot in fluid communication with the dust collector for receiving the one or more catalysts and/or additives from the dust collector, the transfer pot being in fluid communication with the fluidized catalytic cracking unit;

(d) a plurality of load cells for measuring the transfer pot and the one or more catalysts and/or additives positioned within the transfer pot, wherein the weight measured by the plurality of load cells contains either (i) a minimal weight contribution provided by the dust collector or (ii) no weight contribution provided by the dust collector;

(e) a cabinet for housing the dust collector and the transfer pot;

(f) one set of a plurality of legs, wherein only the transfer pot is mounted on the plurality of legs, and each of the legs is secured to a common plate, the plate is mounted on the plurality of load cells, and the plurality of load cells are optionally mounted on a base of the cabinet;

(g) two separate sets of a plurality of legs, wherein a first set of a plurality of legs supports the dust collector and a second set of a plurality of legs supports the transfer pot, and each of the legs within the second set of legs is secured to a common plate, the plate is mounted on the plurality of load cells, and the plurality of load cells are optionally mounted on a base of the cabinet;

(h) a dust collector and a transfer pot that are separate and separatable from one another and each comprises separate respective sidewalls;

(i) at least one flexible section positioned between and in fluid communication with the dust collector and the transfer pot;

(j) at least one flexible section comprising a vertically-extending flexible section;

(k) two vertically-extending flexible sections positioned between and in fluid communication with the dust collector and the transfer pot;

(l) at least one differential pressure gauge system having a differential pressure gauge component positioned within the dust collector;

(m) at least one differential pressure gauge system having a differential pressure gauge component positioned proximate or on a filter positioned within the dust collector (i.e., on a "dirty" side of filter 32), and another differential pressure gauge component positioned within the filter (i.e., on a "dirty" side of filter 32);

(n) at least one differential pressure gauge system having a differential pressure gauge component positioned at any location within a given loading system so as to measure a pressure on a "dirty" side of a filter positioned within a dust collector of the loading system (e.g., filter 32), and another differential pressure gauge component positioned at any location within the given loading system so as to measure a pressure on a "clean" side of the filter positioned within the dust collector of the loading system (e.g., filter 32);

(o) at least one differential pressure gauge system having a differential pressure gauge component positioned at any location within a given loading system so as to measure a pressure on a "dirty" side of a filter positioned within a dust collector of the loading system (e.g., filter 32), and another differential pressure gauge component positioned at any location within the given loading system so as to measure a pressure on a "clean" side of the filter positioned within the dust collector of the loading system (e.g., filter 32), wherein the at least one differential pressure gauge system is coupled to a controller of the loading system;

(p) a controller operatively adapted to (i) monitor a first pressure differential across a filter positioned within the dust collector, and (ii) provide a signal if the first pressure differential equals or exceeds a first pressure differential threshold amount;

(q) a valve positioned between the dust collector and the transfer pot (e.g., pop-up valve 45 or mechanically actuated valve 350), the valve operatively adapted to move from an open position to a closed position in response to a transfer pot pressurizing initiation step;

(r) a discharge valve positioned between the transfer pot and the fluidized catalytic cracking unit, the discharge valve operatively adapted to move from a closed position to an open position in response to one or more system parameters selected from (i) exceeding a pressure threshold amount within the transfer pot, (ii) a first length of time exceeding a designated length of time (e.g., a designated length of time starting at an initiation of a catalyst/additive loading step, or a designated length of time starting at an initiation of the transfer pot pressurizing step); and (iii) any combination of (i) and (ii);

(s) a pop-up valve that moves from an open position to a closed position via air impingement along an outer surface of the valve, the pop-up valve being in contact with an O-ring when in the closed position;

(t) a mechanically actuated valve that moves from an open position to a closed position in response to initiation of a transfer pot pressurization step; and (u) a controller operatively adapted to: (i) monitor a first pressure differential across a filter positioned within the dust collector when the system is in a vacuum mode, and (ii) provide a first signal if the first pressure differential equals or exceeds a first pressure differential threshold amount during the vacuum mode; (iii) monitor a first pressure differential across the filter when the system is in a transfer pot pressurized mode, and (iv) provide a second signal if the first pressure differential changes a first pressure change amount during the transfer pot pressurized mode; and (v) monitor a first pressure differential across the filter when said system is in a stand-by mode, and (vi) provide a third signal if the first pressure differential changes a first pressure change amount during the stand-by mode.

As shown in FIGS. 1-6, in some exemplary embodiments of the present invention, overall system 11 for injecting one or more catalysts and/or additives into a fluidized catalytic cracking unit comprises dust collector 16 in fluid communication with at least one storage bin 37 holding the one or more catalysts and/or additives; vacuum producer 30 in fluid communication with dust collector 16 so that vacuum producer 30 generates a vacuum within dust collector 16 that draws the one or more catalysts and/or additives into dust collector 16; filter 32 positioned within dust collector 16 and being operatively adapted to filter fluid exiting dust collector 16 in response to a vacuum produced by vacuum producer 30; transfer pot 18 in fluid communication with dust collector 16 for receiving the one or more catalysts and/or additives from dust collector 16, transfer pot 18 being in fluid communication with the fluidized catalytic cracking unit and a source of pressurized air so that the one or more catalysts and/or additives is transferred to the fluidized catalytic cracking unit in response to one or more system parameters, the one or more system parameters comprising (i) a pressure threshold amount within the transfer pot, (ii) a first length of time exceeding a designated length of time programmed into controller 60 (e.g., a designated length of time starting at an initiation of a catalyst/additive loading step, or a designated length of time starting at an initiation of the transfer pot pressurizing step); and (iii) any combination of (i) and (ii); and at least one differential pressure gauge 120 having a differential pressure gauge component 108 positioned so as to measure a pressure within dust collector 16 (i.e., on a "dirty" side of filter 32) and a differential pressure gauge component 109 positioned so as to measure a pressure of fluid (e.g., air) exiting dust collector 16 (i.e., on a "clean" side of filter 32). As shown in FIG. 1, in some embodiments, the at least one differential pressure gauge component 108 may be positioned along an outer surface 321 of filter 32, while differential pressure gauge component 109 may be positioned along an internal surface 322 of filter 32. As shown in FIG. 6, in other embodiments, the at least one differential pressure gauge component 108 may be positioned along inner surface 177 of dust collector 16, while differential pressure gauge component 109 may be positioned within hose 35 exiting dust collector 16 and filter 32.

The at least one differential pressure gauge 120 is operatively adapted to measure a first pressure differential across filter 32 (i.e., via internal pressure nipple 108 and external pressure nipple 109) The at least one differential pressure gauge 120 is further operatively adapted to interact with controller 60 operatively adapted to (i) monitor a first pressure differential across filter 32 (i.e., via internal pressure nipple 108 and external pressure nipple 109), and (ii) provide a signal if the first pressure differential equals or exceeds a first pressure differential threshold amount.

Exemplary systems of the present invention further comprise (i) a valve 43 (or valve 350) positioned between dust collector 16 and transfer pot 18, wherein valve 43 (or valve 350) is operatively adapted to move from an open position to a closed position in response to a transfer pot pressurizing initiation step; and (ii) a discharge valve 55 positioned between transfer pot 18 and the fluidized catalytic cracking unit, wherein discharge valve 55 is operatively adapted to move from a closed position to an open position in response to one or more system parameters such as those described above.

In some embodiments, valve 43 comprises a pop-up valve that moves from the open position to the closed position via air impingement along an outer surface of valve 43, with the pop-up valve being in contact with an optional O-ring 570 (see, FIG. 1) when in the closed position. In other embodiments, as shown in FIG. 6, mechanically actuated valve 350 (or electronically actuated valve 350) may be used to close and pressurize transfer pot 18.

Figure 7:
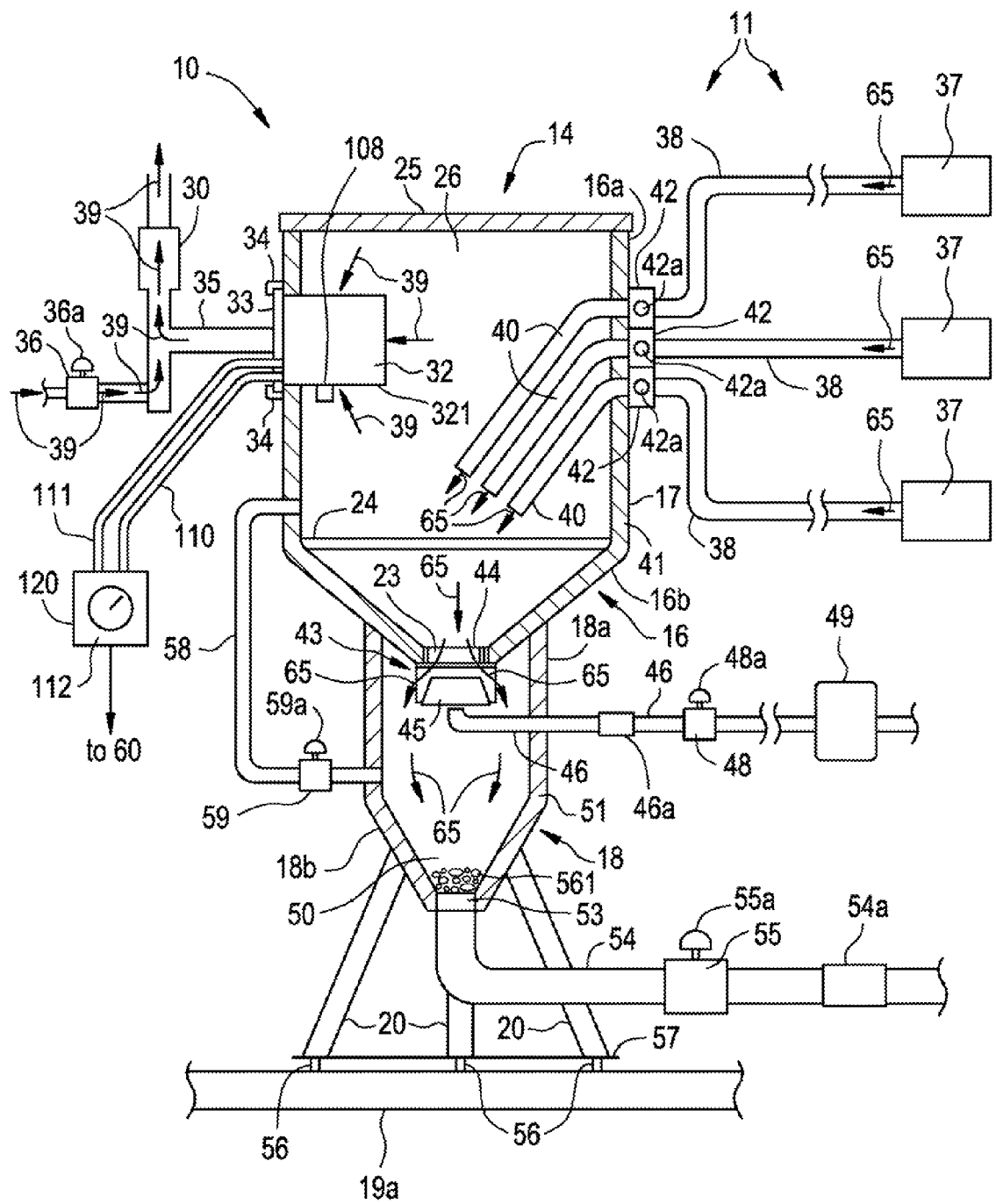
FIG. 7 depicts the exemplary system shown in FIG. 1 when the exemplary system is in a vacuum mode.
Figure 8:
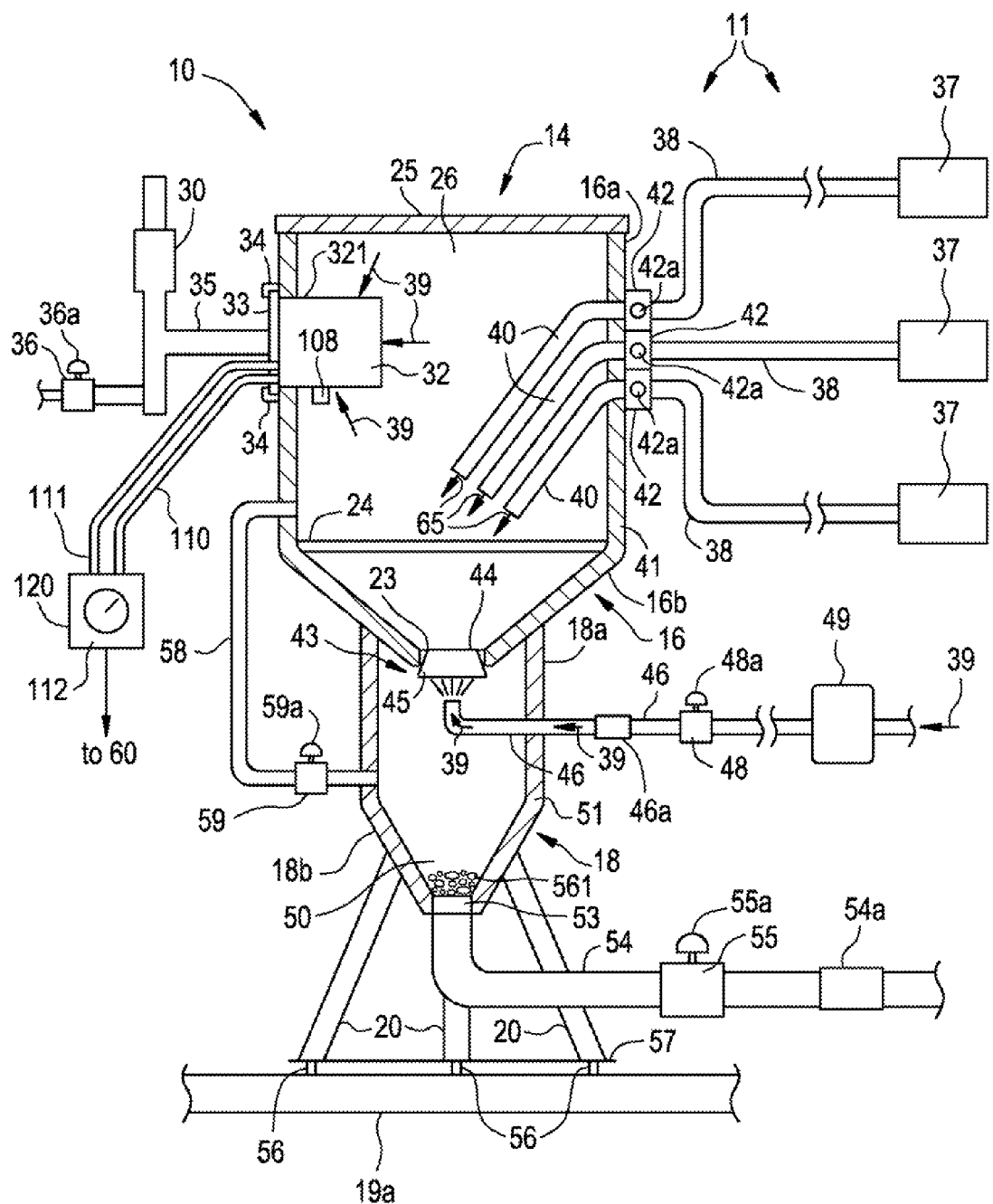
FIG. 8 depicts the exemplary system shown in FIG. 1 when the exemplary system is in a transfer pot pressurized mode.
Figure 9:
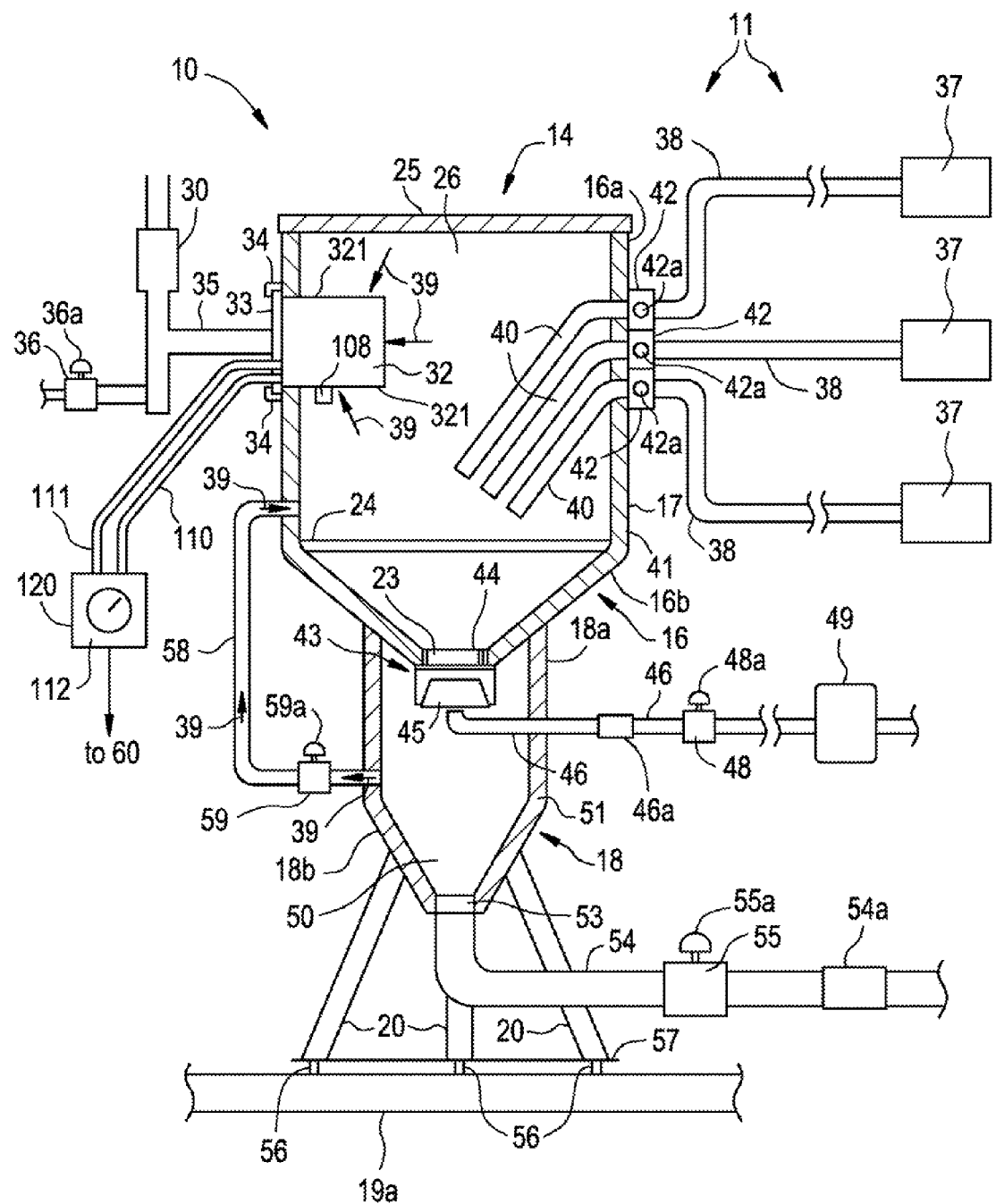
FIG. 9 depicts the exemplary system shown in FIG. 1 when the exemplary system is in a stand-by mode.

In desired embodiments, the disclosed systems 10/11/100/110 further comprise controller 60 operatively adapted to (i) monitor a first pressure differential across filter 32 when system 10/11/100/110 is in a vacuum mode (as shown in FIG. 7), and (ii) provide a first signal if the first pressure differential equals or exceeds a first pressure differential threshold amount during the vacuum mode; (iii) monitor a first pressure differential across filter 32 when system 10/11/100/110 is in a transfer pot pressurized mode (as shown in FIG. 8), and (iv) provide a second signal if the first pressure differential changes a first pressure change amount during the transfer pot pressurized mode; and (v) monitor a first pressure differential across filter 32 when system 10/11/100/110 is in a stand-by mode (as shown in FIG. 9), and (vi) provide a third signal if the first pressure differential changes a first pressure change amount during the stand-by mode.

FIG. 7 depicts exemplary system 10/11 in a vacuum mode. As shown in FIG. 7, during the vacuum mode, valve 36 is open, which permits pressurized air to flow through vacuum producer 30. The flow of pressurized air through vacuum producer 30 draws air from internal volume 26 of dust collector 16, thereby generating a vacuum within internal volume 26, and causing catalyst and/or additive to flow from storage bin(s) 37 through valves 42 and into dust collector 16. Vacuum producer 30 draws air through filter 32, thereby causing dust collector 16 to collect the dust generated by the flow of catalyst and/or additive into dust collector 16 via the vacuum.

As further shown in FIG. 7, during the vacuum mode, valve 43 is in an open position so that catalyst and/or additive 561 falls into transfer pot 18 and accumulates in a lower region of transfer pot 18. Valve 55 is in a closed position so that catalyst and/or additive 561 remains in transfer pot 18 while being weighed via load cells 56. Further, valve 48 is closed so as to enable flow of catalyst and/or additive 561 into transfer pot 18.

During the vacuum mode, at least one differential pressure gauge 120 measures a first pressure differential across filter 32. If the first pressure differential across filter 32 exceeds a first pressure differential threshold value, which may indicate, for example, a blocked and/or dirty filter, controller 60 provides a first signal to a user or operator. The first signal may be in the form of a light (e.g., on the loader, at an operator work station, at a remote location, or any combination there), a sound (e.g., on the loader, at an operator work station, at a remote location, or any combination there), a message sent to a remote location, a system shutdown, or any combination thereof.

FIG. 8 depicts exemplary system 10/11 in a transfer pot pressurized mode. As shown in FIG. 8, during the transfer pot pressurized mode, valve 48 is in an open position so that pressurized air can flow into transfer pot 18 (and impinge upon plug 45, when present, after exiting of piping 46, forcing plug 45 into a closed position against seat 44). During this step, either (i) pop-up valve 45 closes due to impingement of air thereon or (ii) mechanically actuated valve 350 is closed. Valve 55 is in a closed position so that catalyst and/or additive 561 remains in transfer pot 18 during the transfer pot pressurized mode. Further, valve 59 is closed so as to enable pressurizing of transfer pot 18.

As further shown in FIG. 8, during the transfer pot pressurized mode, valve 36 is closed, which prevents pressurized air from flowing through vacuum producer 30. Further, valves 42 are in a closed position.

During the transfer pot pressurized mode, at least one differential pressure gauge 120 measures a first pressure differential across filter 32. If the first pressure differential across filter 32 exceeds a first pressure differential threshold value, which may indicate, for example, a leak at the seal between plug 45 and O-ring 570 (or a leak within mechanically actuated valve 350 shown in FIG. 6), controller 60 provides a second signal to a user or operator. Like the first signal, the second signal may be in the form of a light (e.g., on the loader, at an operator work station, at a remote location, or any combination there), a sound (e.g., on the loader, at an operator work station, at a remote location, or any combination there), a message sent to a remote location, a system shutdown, or any combination thereof. The second signal may differ from the first signal so as to identify an alarm during the transfer pot pressurized mode instead of the vacuum mode.

FIG. 9 depicts exemplary system 10/11 in a stand-by mode. As shown in FIG. 9, during the stand-by mode, the following valves are in a closed position: valves 42, valve 36, valve 48, and valve 53; the following valves are in an open position: valve 43, valve 55 and valve 59. (Also, valve 350 shown in FIG. 6 is open in during the stand-by mode.)

During the stand-by mode, at least one differential pressure gauge 120 measures a first pressure differential across filter 32. If the first pressure differential across filter 32 exceeds a first pressure differential threshold value, which may indicate, for example, a leak at the seal of discharge valve 53, controller 60 provides a third signal to a user or operator. Like the first and second signals, the third signal may be in the form of a light (e.g., on the loader, at an operator work station, at a remote location, or any combination there), a sound (e.g., on the loader, at an operator work station, at a remote location, or any combination there), a message sent to a remote location, a system shutdown, or any combination thereof. Further, the third signal may differ from the first and second signals so as to identify an alarm during the stand-by mode instead of the vacuum mode or the transfer pot pressurized mode.

In one desired embodiment, each of the first, second, and third signals independently comprises at least one of: (i) a message to a user, (ii) a flashing light, and (iii) a system shutdown.

Although not limited in any way, a typical first pressure differential threshold value during the vacuum mode is from about 0.0 to about 8.0 inches of water; a typical first pressure differential threshold value during the transfer pot pressurized mode is from about 0.0 to about 0.5 inches of water; and a typical first pressure differential threshold value during the stand-by mode is from about 0.0 to about 0.5 inches of water.

In many embodiments of the present invention, the at least one differential pressure gauge having a differential pressure gauge component positioned within the dust collector comprises a single differential pressure gauge (e.g., differential pressure gauge 120 with differential pressure gauge component 108 positioned within dust collector 16 (i.e., on a dirty side of filter 32) and differential pressure gauge component 109 positioned within a fluid exiting dust collector 16 and filter 32 (i.e., on a clean side of filter 32) shown in FIGS. 1-2 and 6-9).

Although not shown in FIGS. 1-9, the loading systems of the present invention may further comprise one or more additional components. For example, additional pressure nipples could be positioned within system 10 or 100 so as to measure pressure differential readings across two or more different points, if desired, while using a single differential pressure gauge and controller. Further, a second differential pressure gauge could be utilized to measure pressure drops across one or more valves within system 10 or 100. One example would be to take a pressure differential reading across each product inlet to see if there is air flowing, when it should not be, so as to indicate that a particular inlet valve is failing. The second differential pressure gauge could be coupled with the same PLC program (i.e., controller 60) to shut that particular product/valve off and give an alarm similar to the first differential pressure gauge described above.

In addition, one or more pressure transmitters may be positioned within a given loading system to measure one or more system pressure values. For example, a pressure transmitter may be used to monitor a pressure within the transfer pot. The pressure transmitter may be positioned within the transfer pot, or in a system location that is in communication with the pressurized air supplied to the transfer pot (e.g., air within piping 46).

The present invention is further directed to method of monitoring a pressure within a system for injecting catalyst and/or additives into a fluidized catalytic cracking unit. In one exemplary embodiment shown in FIG. 1, the method of monitoring a pressure within system 10 for injecting catalyst and/or additives into a fluidized catalytic cracking unit comprises monitoring a first pressure differential across a filter 32 positioned within a dust collector 16 and operatively adapted to filter fluid exiting dust collector 16 in response to a vacuum produced by a vacuum producer 30 when system 10 is in a vacuum mode; monitoring the first pressure differential across filter 32 when system 10 is in a transfer pot pressurized mode; monitoring the first pressure differential across filter 32 when system 10 is in a stand-by mode; and providing one or more signals selected from: (i) a first signal if the first pressure differential equals or exceeds a first pressure differential threshold amount during the vacuum mode, (ii) a second signal if the first pressure differential equals or exceeds a first pressure differential threshold amount during the transfer pot pressurized mode, and (iii) a third signal if the first pressure differential equals or exceeds a first pressure differential threshold amount during the stand-by mode.

In some embodiments, the providing step comprises providing each of the first signal, the second signal, and the third signal. Further, in some embodiments, each of the first signal, the second signal and the third signal independently comprises at least one of: (i) a message to a user, (ii) a flashing light, and (iii) a system shutdown.

As discussed above, monitoring of the first pressure differential during the various modes of operation comprises monitoring the first pressure differential via a programmable controller (e.g., controller 60 shown in FIG. 4). Further, as shown in FIGS. 1-2 and 6-9 and as discussed above, monitoring of the first pressure differential may be performed via a single differential pressure gauge (i.e., positioned within cabinet 19 shown in FIGS. 3-4) having a differential pressure gauge component positioned within the dust collector (e.g., via differential pressure gauge 120 with differential pressure gauge component 108 positioned along outer surface 321 of filter 32 within dust collector 16 shown in FIGS. 1-2 or along inner surface 177 of dust collector 16 as shown in FIG. 6).

The processes of the present invention may further comprise one or more of the following process steps and/or process features, in addition to those described above, wherein the one or more additional process steps and/or process features include, but are not limited to:

(a) storing at least one or more catalysts and/or additives at a first location;

(b) generating a vacuum within a loading unit comprising a dust collector in fluid communication with and separatable from a transfer pot;

(c) drawing the one or more catalysts and/or additives from one or more storage bins and into the dust collector of the loading unit in response to the vacuum;

(d) determining a weight of the one or more catalysts and/or additives positioned in the transfer pot of the loading unit, wherein the determining step comprises weighing the transfer pot and the one or more catalysts and/or additives positioned in the transfer pot so as to obtain a transfer pot/contents weight, wherein the transfer pot/contents weight contains either (i) a minimal weight contribution provided by the dust collector or (ii) no weight contribution provided by the dust collector;

(e) monitoring a weight of the one or more catalysts and/or additives drawn into the loading unit (i.e., the transfer pot) and stopping generation of the vacuum when the weight reaches a predetermined value;

(f) pressurizing the transfer pot of the loading unit;

(g) injecting the one or more catalysts and/or additives into the fluidized catalytic cracking unit in response to reaching a threshold pressure within the transfer pot of the loading unit;

(h) monitoring a pressure within the transfer pot of the system (or any other system component having an equal pressure with the transfer pot) and via at least one pressure transmitter;

(i) monitoring the pressure within the transfer pot of the system (or any other system component having an equal pressure with the transfer pot) via a single pressure transmitter (e.g., a single pressure transmitter operatively adapted to monitor the pressure of the transfer pot); and (j) monitoring of the first pressure differential across a filter positioned with a dust collector of the system via a single differential pressure gauge having a differential pressure gauge component positioned within the dust collector (e.g., on a dirty side of filter 32 within dust collector 16) and another pressure gauge component positioned within a fluid stream exiting the dust collector (e.g., on a clean side of filter 32, e.g., within hose 35 exiting dust collector 16).

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

PARTS LIST

Loading systems 10 100
Systems 11 and 110 for storing and loading catalyst and/or additives
Loading units 14 and 140
Dust collectors 16 and 160
Upper portion 16a (of dust collector 16 and 160)
Lower portion 16b (of dust collector 16 and 160)
Sidewall 17 (of dust collector 16 and 160)
Transfer pots 18 and 180
Cabinet 19
Base 19a (of cabinet 19)
Legs 20 (on loading unit 14 and 140)
Legs 120 (on loading unit 140)
Opening 23 (in lower portion 16b)
Screen 24
Cover 25
Internal volume 26 (within dust collector 16 and 160)
Vacuum producer 30
Filter 32
Hatch 33 (in dust collector 16 and 160)
Brackets 34
Hose 35
Valve 36
Actuator 36a (of valve 36)
Storage bins 37
Hoses 38
Arrows 39
Pipe guides 40
Valve 42
Actuator 42a (of valve 42)
Valve 43
Seats 44 and 144
Plug 45 (of valve 43)
Piping 46
Flexible section 46a (of piping 46)
Valve 48
Actuator 48a (of valve 48)
Volume chamber and moisture trap 49
Internal volume 50 (within transfer pot 18 and 180)
Sidewall 51 (of transfer pot 18 and 180)
Opening 53 (in lower portion 18a of transfer pot 18 and 180)
Piping 54
Flexible section 54a (of piping 54)
Valve 55
Actuator 55a (of valve 55)
Load cells 56
Plate 57
Piping 58
Flexible section 58a (of piping 58)
Valve 59
Controller 60
Brackets 61
Jack assemblies 62
Shafts 62a (of jack assemblies 62)
Nuts 62b
Control panel 64 (of controller 60)
Arrows 65
Internal pressure nipple 108
External pressure nipple 109
Tubing 110 and 111
Gauge 112

Differential pressure gauge 120
Piping 168 and 268
Flexible section 168a (of piping 168)
Inner surface 177 of dust collector 16
Outer surface 321 of filter 32
Inner wall inner surface 322 of filter 32
Outer wall inner surface 325 of filter 32
Inner wall outer surface 326 of filter 32
Filtration material 333 of filter 32
Catalyst and/or additive (positioned within transfer pot) 561
O-ring 570

What is claimed is:

1. A system for injecting catalyst and/or additives into a fluidized catalytic cracking unit, comprising:
   (a) a dust collector in fluid communication with at least one storage bin holding one of the catalyst and/or additives;
   (b) a vacuum producer in fluid communication with the dust collector so that the vacuum producer generates a vacuum within the dust collector that draws the one of the catalyst and/or additives into the dust collector;
   (c) a filter positioned within said dust collector and operatively adapted to filter fluid exiting said dust collector in response to a vacuum produced by said vacuum producer;
   (d) a transfer pot in fluid communication with the dust collector for receiving the one of the catalyst and/or additives from the dust collector, the transfer pot being in fluid communication with the fluidized catalytic cracking unit and a source of pressurized air; and the one of the catalyst and/or additives is transferred to the fluidized catalytic cracking unit in response to one or more system parameters; and
   (e) at least one differential pressure gauge having a differential pressure gauge component positioned so as to measure a pressure of said dust collector.

2. The system of claim 1, wherein said at least one differential pressure gauge component comprises an internal pressure nipple positioned along an inner surface of said dust collector or an outer surface of said filter within said dust collector.

3. The system of claim 1, wherein said at least one differential pressure gauge further comprises an external pressure nipple positioned so as to measure a pressure of fluid exiting said dust collector and said filter, and said at least one differential pressure gauge is operatively adapted to measure a first pressure differential across said filter.

4. The system of claim 1, wherein said system further comprises:
   a controller operatively adapted to (i) monitor a first pressure differential across said filter, and (ii) provide a signal if the first pressure differential equals or exceeds a first pressure differential threshold amount.

5. The system of claim 1, wherein said system further comprises:
   (a) a valve positioned between said dust collector and said transfer pot, said valve operatively adapted to move from an open position to a closed position in response to a transfer pot pressurizing initiation step; and
   (b) a discharge valve controller positioned between said transfer pot and the fluidized catalytic cracking unit, said discharge valve operatively adapted to move from a closed position to an open position in response to one or more system parameters.

6. The system of claim 5, wherein said valve positioned between said dust collector and said transfer pot comprises a pop-up valve that moves from the open position to the closed position via air impingement along an outer surface of said pop-up valve, said pop-up valve being in contact with an O-ring when in the closed position.

7. The system of claim 5, wherein said valve positioned between said dust collector and said transfer pot comprises a mechanically actuated valve or an electronically activated valve.

8. The system of claim 5, wherein said system further comprises: controller operatively adapted to:
   (i) monitor a first pressure differential across said filter when said system is in a vacuum mode, and
   (ii) provide a first signal if the first pressure differential equals or exceeds a first pressure differential threshold amount during the vacuum mode;
   (iii) monitor a first pressure differential across said filter when said system is in a transfer pot pressurized mode, and
   (iv) provide a second signal if the first pressure differential equals or exceeds a first pressure differential threshold amount during the transfer pot pressurized mode;
   and
   (i) monitor a first pressure differential across said filter when said system is in a stand-by mode, and
   provide a third signal if the first pressure differential equals or exceeds a first pressure differential threshold amount during the stand-by mode.

9. The system of claim 8, wherein the first pressure differential threshold amount during the vacuum mode is from about 0.0 psi to about 10.0 psi, the first pressure differential threshold amount during the transfer pot pressurized mode is from about
   0.3 psi to about 0.6 psi, and the first pressure differential threshold amount during the stand-by mode is from about 0.3 psi to about 0.6 psi.

10. The system of claim 8, wherein each of said first signal, said second signal and said third signal independently comprises at least one of: (i) a message to a user, (ii) a flashing light, and (iii) a system shutdown.

11. The system of claim 1, wherein said at least one differential pressure gauge comprises a single differential pressure gauge.

12. The system of claim 1, further comprising a plurality of load cells for measuring a weight of the transfer pot, and the one of the catalyst and/or additives positioned within the transfer pot.

13. The system or method of claim 1, the one or more system parameters comprise one or more of: a pressure of the system, a pressure of the transfer pot, a designated length of time programmed into a system controller, a designated length of time programmed into a system controller, a designated length of time starting at an initiation of a catalyst/additive loading step, and a designated length of time starting at an initiation of the transfer pot pressurizing step.

* * * * *